Aug. 5, 1969
J. J. CALLAHAN
3,459,278
INDICATING MEANS FOR DIVISIONAL LUBRICANT FEEDER
Filed Sept. 27, 1967
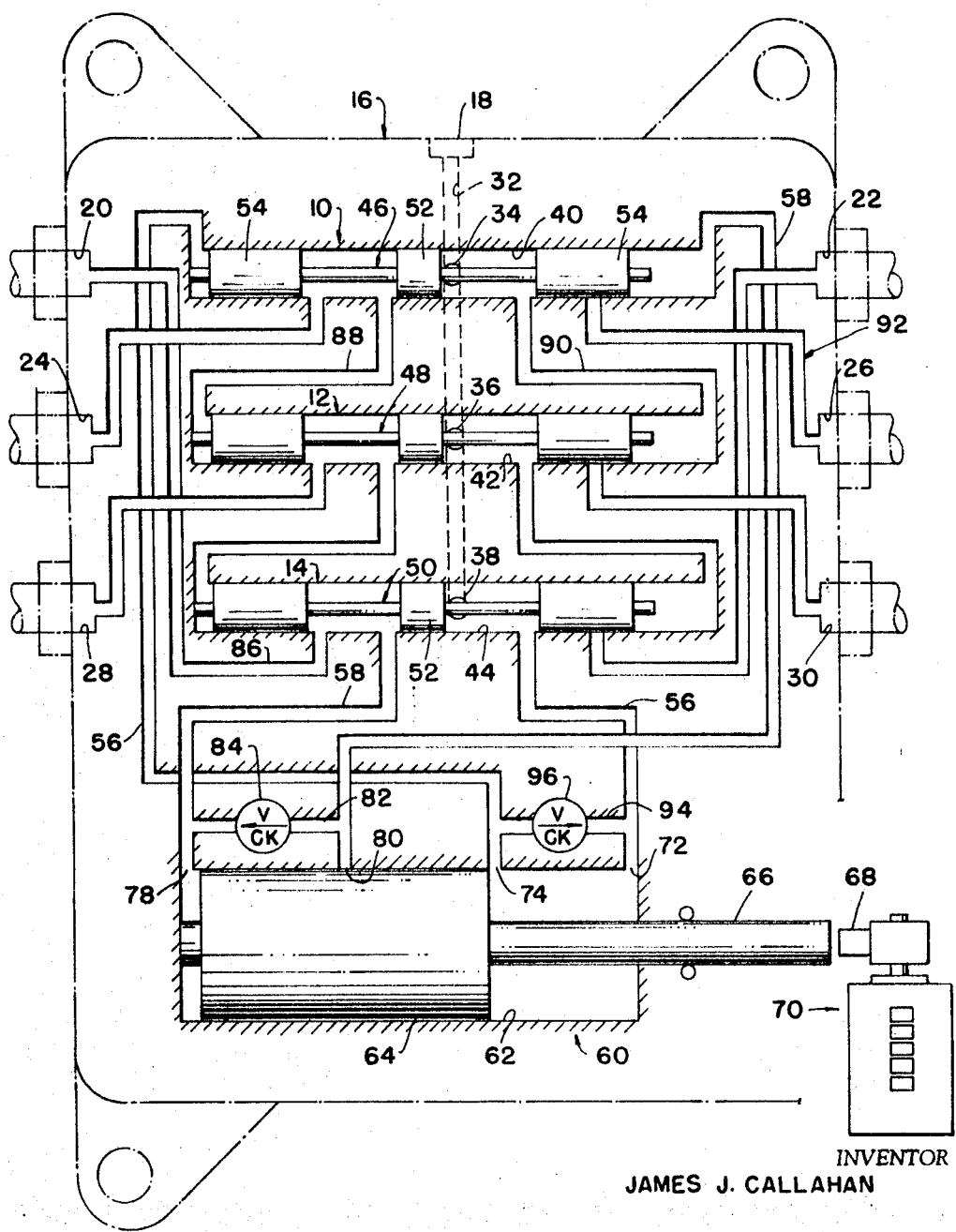
INVENTOR
JAMES J. CALLAHAN
BY Whittemore, Hulbert & Belknap
ATTORNEYS

United States Patent Office 3,459,278
Patented Aug. 5, 1969

3,459,278
INDICATING MEANS FOR DIVISIONAL LUBRICANT FEEDER
James J. Callahan, Bloomfield Hills, Mich., assignor to McCord Corporation, Detroit, Mich., a corporation of Maine
Filed Sept. 27, 1967, Ser. No. 670,833
Int. Cl. F01m 1/14
U.S. Cl. 184—7  5 Claims

ABSTRACT OF THE DISCLOSURE

A divisional lubricant feeder of the sequential divider valve type in which a piston and cylinder unit is interposed in certan of the transfer passages between two of the divider valves so that lubricant under pressure effects reciprocation of the piston once in each complete cycle of operation. A mechanically actuated counter is operated by the piston to record the cycles of operation.

This invention relates to divisional lubricant feeders in which a series of valves are interconnected for the sequential and cyclical discharge of lubricant therefrom to a plurality of bearings or other parts to be lubricated. A lubricant feeder of the type to which this invention pertains is disclosed in Porter et al. U.S. Patent No. 3,298,460.

It is desirable to employ a counter or similar device to record the number of cycles of operation of the metering block. Most systems in commercial use at the present time employ the piston of one of the divider valves to actuate the counter through a mechanical linkage or motion transmitting connection between such piston and the counter. In view of the variable nature of the stroke of the piston or the pin actuated thereby, such devices are unreliable and on occasion may skip a count or record a double count. These conditions are particularly liable to occur at extreme high or low flow rates.

According to the present invention, a separate piston and cylinder unit is interposed in the passages which extend between two of the divider valves in such a way that lubricant under pressure from the pump effects reciprocation of the auxiliary piston once in each cycle of operation. The piston has a considerably longer stroke than the divider valve pistons and is of larger diameter so as to provide positive actuation of the counter unit during each cycle of operation.

It is therefore the object of the present invention to provide a new and improved hydraulically actuated piston and cylinder unit cooperable with a mechanically actuated counter to record the cycles of operation of a series of sequentially operated lubricant divider valves.

The accompanying drawing is a sectional schematic view of a divisional lubricant feeder embodying the present invention.

A divisional lubricant feeder comprises a series of divider valves 10, 12 and 14 mounted on a base 16 having an inlet 18 adapted to be connected to a pump for supplying lubricant under pressure to the valves. The base is also provided with outlets 20, 22, 24, 26, 28 and 30 through which measured quantities of lubricant are discharged for delivery to the parts to be lubricated. The construction of the individual valve units 10, 12 and 14 and the base 16 and the mounting of the valve units on the base are not illustrated herein but may be similar to that shown in U.S. Patent No. 3,298,460, although the invention is not limited to lubricant feeders of the kind disclosed in said patent.

The base is provided with an inlet manifold 32 communicating with passages 34, 36 and 38 which open into the bores 40, 42 and 44 of the metering valves 10, 12 and 14 respectively. The valves 10, 12 and 14 include multilobed pistons 46, 48 and 50 respectively.

The valves 10, 12 and 14 are interconnected by a series of passages formed in the individual valve blocks and the base for sequential operation of the valves as long as lubricant under pressure is supplied to the inlet manifold 32. The pistons 46, 48 and 50 are all shown in their left-hand position in the drawing. Each valve consists of a central valve portion 52 and piston portions 54 at the ends thereof. With the valves in the position shown, lubricant under pressure will flow from the valve bore 44 through a transfer passage 56 and ultimately to the left-hand end of the valve bore 40 to force the piston 46 therein to the right to discharge lubricant from the right-hand end of bore 40 through passage 58 and ultimately to the outlet terminal 20 leading to one of the points to be lubricated.

An auxiliary piston and cylinder unit 60 is interposed in the passage 56 and consists of a cylinder 62 and a piston 64 reciprocable within the cylinder 62 and carrying a piston rod 66 which extends through one end of the cylinder 62 and is engageable with an arm 68 forming a part of a mechanically actuated counter 70. The piston 64 is of considerably larger diameter than the pistons 46, 48 and 50 and has a substantially longer stroke than the valve pistons. The passage 56 communicates with the cylinder 62 at two axially spaced points 72 and 74 at the right-hand end of the cylinder 62. The transfer passage 58 similar to the passage 56 but leading from the bore 54 on the left-hand side of the valve portion 52 of piston 50 communicates with the left-hand end of the cylinder 62 at axially spaced points 78 and 80. The passage 58 leads to the right-hand end of the valve bore 40.

As soon as the piston 50 shifts to the left to the position shown, lubricant under pressure is supplied through passage 56 to the right-hand end of the cylinder 62 to shift the piston 64 to the left, thereby retracting the piston 64 and allowing the counter 70 to index to the starting position. As soon as port 74 in cylinder 62 is opened by movement of the piston 64 to the left, lubricant under pressure continues to flow through passage 56 to the left-hand end of the valve bore 40 to shift the piston 46 therein to the right to discharge lubricant through the passage 58. Since port 80 is closed by the piston 64 at this time, the lubricant flows through a by-pass line 82 having a check valve 84 therein and into the valve bore 44 on the left-hand side of the portion 52 of piston 50 thereby discharging lubricant under pressure through passage 86 to the outlet 20 leading to one of the points to be lubricated. As soon as piston 46 has shifted to the right, lubricant under pressure will be supplied through passage 34 to the bore 40 on the left-hand side of the valve portion 52 of piston 46, thereby supplying lubricant under pressure through line 88 to the left-hand end of piston 48, thereby shifting the latter to the right to discharge lubricant through line 90 to the valve bore 40 and from such bore through passage 92 to the outlet 26 leading to another of the points to be lubricated. The device will continue cycling in this manner automatically as long as lubricant under pressure is supplied to the inlet manifold. When the piston 50 is shifted to the right, lubricant under pressure will be discharged in a reverse direction through passage 58 to the port 78 in cylinder 62, thereby shifting the piston 64 to the right to engage the arm 64 on the counter 70 to record a complete cycle of operation of the entire series of divider valves. The check valve 84 prevents flow through the by-pass line 82 at this time. As soon as port 80 is uncovered by piston 64, the flow will continue through passage 58 to the right-hand end of valve bore 40 to shift the piston 46 to the left. The passage 56 is also provided with a by-pass line 94 having a check valve 96 therein which prevents flow through the by-pass 94 when lubricant is flowing through passage 56 and port 72 into the right-hand end of cylinder 62. The check valve 96 permits flow through the by-pass when the piston 64 is in its right-hand position.

The auxiliary piston and cylinder unit 60 may be connected into the system between any two of the divider valves which operate in sequence, thus allowing placing of the unit at any desired location on the metering block which may consist of three or more of the divider valve units. The use of an auxiliary piston and cylinder unit for actuating the counter permits the actuating rod 66 to have a longer stroke than would be possible if one of the pistons 46, 48 or 50 were used as the actuating member for the counter. Since the cylinder 62 is supplied with lubricant under pressure from the pump through the passages described, the movement of the piston 64 is positive and the counter is not subject to the variable nature of the stroke of one of the valve pistons.

What I claim as my invention is:

1. In a divisional lubricant feeder comprising a series of sequentially operated divider valve units each comprising a piston reciprocable in a bore, and wherein lubricant under pressure is supplied to each bore, one of said valve units in one position of the piston therein discharging lubricant under pressure from the bore thereof through a transfer passage to one end of a different bore, and in the second position of said piston discharging lubricant under pressure from the bore through a second transfer passage to the other end of said different bore, the improvement comprising an auxiliary cylinder and piston unit, said first transfer passage communicating with one end of said cylinder and said second transfer passage communicating with the other end of said cylinder, whereby said auxiliary piston is reciprocated once during each cycle of operation of said valve units, and means cooperable with said auxiliary piston for recording successive cycles of operation.

2. A lubricant feeder according to claim 1 wherein said auxiliary piston has a diameter and stroke substantially greater than the diameter and stroke of said divider valve pistons.

3. A lubricant feeder according to claim 1 wherein each transfer passage communicates at axially spaced points with said cylinder and wherein one of said points of communication is closed by said auxiliary piston when the latter is at one end of its stroke.

4. A lubricant feeder according to claim 3 including a by-pass line for each transfer passage having a check valve therein permitting lubricant flow through said passage in one direction when said auxiliary piston closes said one point of communication of such passage with said cylinder.

5. A lubricant feeder according to claim 4 wherein said auxiliary piston has a stroke substantially longer than the stroke of said valve pistons.

References Cited

UNITED STATES PATENTS

| | | | |
|---|---|---|---|
| 2,269,928 | 1/1942 | Dirkes | 184—7 |
| 2,792,911 | 5/1957 | Harter | 184—7 |
| 2,834,433 | 5/1958 | Higgens | 184—7 |
| 3,223,198 | 12/1965 | Gruber | 184—7 |
| 3,298,460 | 1/1967 | Porter et al. | 184—7 |

HALL C. COE, Primary Examiner